United States Patent [19]
Sciammarella et al.

[11] Patent Number: 5,419,716
[45] Date of Patent: May 30, 1995

[54] POWER OUTLET AND PHONE JACK WALL ADAPTOR

[75] Inventors: Eduardo Sciammarella, Hoboken; Michael Lang, Ridgewood, both of N.J.

[73] Assignee: Sony Electronics Inc., Park Ridge, N.J.

[21] Appl. No.: 197,262

[22] Filed: Feb. 16, 1994

[51] Int. Cl.⁶ .............................................. H01R 13/60
[52] U.S. Cl. ..................... 439/540; 439/535; 439/676
[58] Field of Search ................ 439/535, 536, 540, 676

[56] References Cited

U.S. PATENT DOCUMENTS

| | | |
|---|---|---|
| 2,162,864 | 6/1939 | Rugg et al. ...................... 439/535 X |
| 4,636,914 | 1/1987 | Belli . |
| 4,655,529 | 4/1987 | Yokoyama ......................... 439/535 |
| 4,758,536 | 7/1988 | Miller et al. . |
| 4,778,399 | 10/1988 | Schenk ............................... 439/538 |
| 4,800,696 | 1/1989 | Miller et al. . |
| 5,043,531 | 8/1991 | Gutenson et al. . |
| 5,117,122 | 5/1992 | Hogarth et al. . |
| 5,122,069 | 6/1992 | Brownlie et al. ............... 439/535 X |

Primary Examiner—Eugene F. Desmond
Attorney, Agent, or Firm—Ronald P. Kananen

[57] ABSTRACT

A power outlet and phone jack adaptor having a generally rectangular recess and a back wall upon which a power outlet and telephone jack are positioned in close proximity to one another is disclosed. Indentations on the side walls of the recess enable the user to easily plug in or unplug an accessory, such as an electrical transformer. The recess is deep enough so that the accessory when plugged in does not protrude from the adaptor.

4 Claims, 1 Drawing Sheet

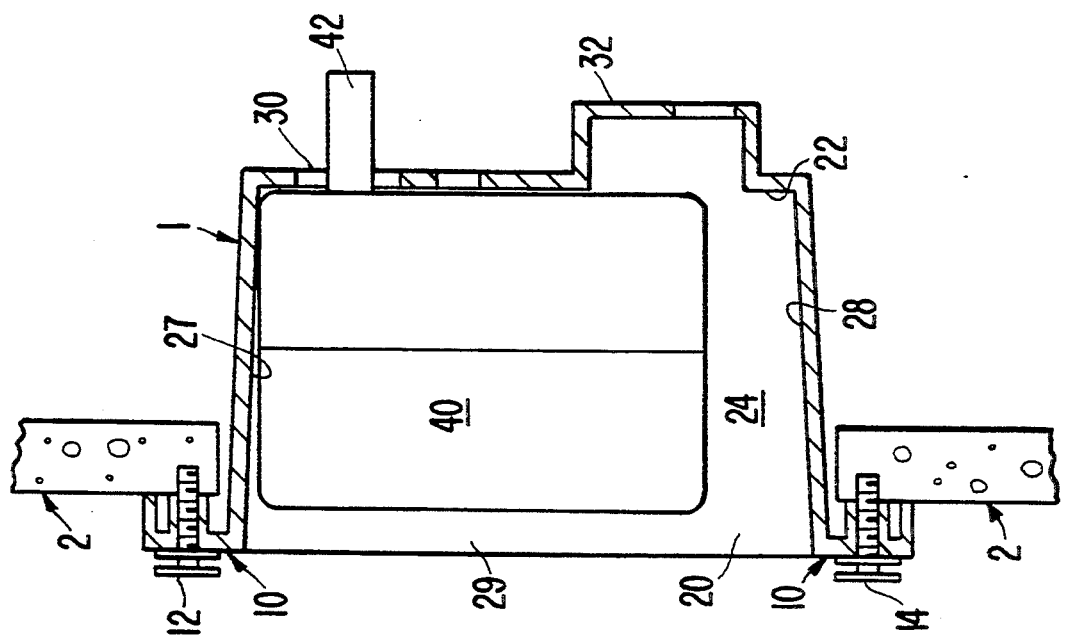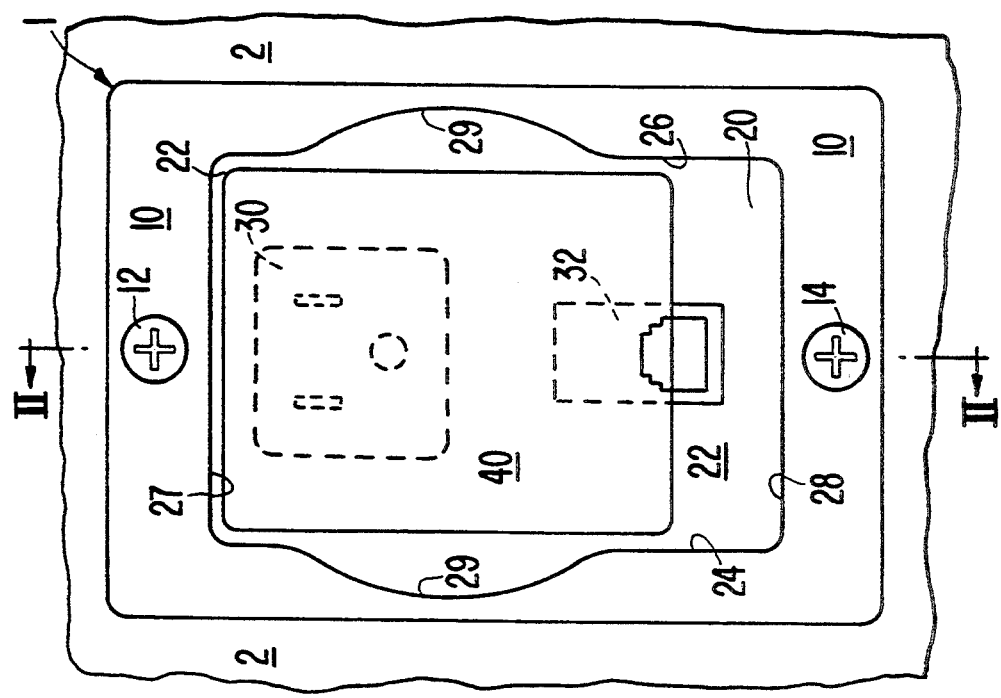

5,419,716

POWER OUTLET AND PHONE JACK WALL ADAPTOR

BACKGROUND OF THE INVENTION

A conventional phone uses phone plugs which convey both electrical power for the operation of the phone as well as the communication signals sent to and from the phone. However, as telephone products become increasingly more complex and have increasing functionality, many modern telephone-related products —such as cordless telephones, answering machines and the like —require an external AC power source in addition to the telephone line power source in order to operate. Accordingly, modern telephone systems often require the proximity of an AC power source outlet to the telephone jack. However, often the AC power outlet and the telephone outlet jack are not located near one another.

This causes the user to run wires from the two separate locations of the outlet and the jack which can result in inconvenience, a disorderly appearance and possibly raise safety concerns.

Further, many modern telephone devices require an electrical accessory such as a power transformer. When plugged into the conventional electrical output, these accessories protrude from the surface of the power outlet which results in a disorderly appearance and lack of optimum performance (e.g., the accessory can be inadvertently bumped and thereby dislodged).

What is needed then is an adaptor which can accommodate both telephone jacks and AC power outlets in close proximity to one another. Further, the adaptor should also be able to house an electrical accessory so that it does not protrude out of the adaptor when plugged into the adaptor.

SUMMARY OF THE INVENTION

An adaptor has a plurality of side walls and a back wall and has an AC power outlet and a telephone jack both contained on the back wall of a recess on the adaptor. The recess is rectangularly shaped and deep enough so that an electrical accessory—such as a power transformer—when plugged into the outlet on the back wall does not protrude beyond the perimeter of the adaptor. Further, the side walls of the recess have indentations to enable the user to grip the electrical accessory and thereby plug in or remove the accessory.

A principal object of the invention therefor is to provide an adaptor having both an AC outlet and a telephone jack in close proximity to one another.

It is another object of the present invention to provide a rectangular recess defined by the adaptor to house an electrical accessory so that when the accessory is plugged into the AC power outlet, the accessory will not protrude from the adaptor.

It is yet another object of the invention to provide indentations on the side walls of the recess defined by the adaptor so that the electrical accessory may be easily grasped by the user when being plugged into or removed from the outlet.

Other objects and uses of the present invention will become obvious to one skilled in the art based upon the following specification, drawings and claims.

BRIEF DESCRIPTION OF THE DRAWINGS

FIG. 1 is a front view of a power outlet and phone jack wall adaptor embodying the present invention; and FIG. 2 is a partial sectional view of the adaptor of FIG. 1 taken generally along line II—II of FIG. 1.

DESCRIPTION OF THE PREFERRED EMBODIMENT

Referring now to the drawings, a power outlet and phone jack adaptor, generally indicated by numeral 1 and embodying the present invention, is shown therein.

As shown in FIG. 1, the adaptor 1, which may be made of plastic or any other suitable material, is attached to a surface 2, such as a wall, by placing a flat face plate 10 of the adaptor 1 against the surface 2 and securing it to the surface 2 by screws 12 and 14. The adaptor 1 also has a generally rectangular recess 20 connected to the face plate 10. The recess 20 is defined by a back wall 22, two opposed side walls 24 and 26, a top wall 27 and a bottom wall 28. The side walls 24 and 26 each have a curved indentation 29, the function of which will be described below.

On the back wall 22 are positioned a conventional AC power outlet 30 (as is well known in the art) and a conventional telephone jack 32 (as is also well known in the art) in close proximity to another.

As shown in FIG. 1, an electrical accessory 40, such as a power transformer, may be positioned within the recess 20 and plugged into the AC power outlet 30. As also shown in FIG. 1, the indentations 29 on the side walls 24 and 26 provide an ample space for a user to insert his or her fingers into the indentations 24 and between the electrical accessory 40 and the side walls 24 and 26 so as to grip the electrical accessory 40 when the accessory 40 is plugged into or removed from outlet 30. This enables the user to easily plug in or unplug the accessory 40 from the outlet 30.

Similarly, adequate room exists in the recess 20 to easily plug or unplug a conventional telephone plug (not shown) from the telephone jack 32 on the back wall 22 of the adaptor 1.

As best shown in FIG. 2, the generally rectangular shape of the recess 20 is sized to accommodate the rectangular shape of the electrical accessory 40. Further, when the plugs 42 of the accessory 40 are positioned within the outlet 30, the accessory 40 does not protrude from the periphery of the adaptor 1 (namely, as shown in FIG. 2, the accessory 40 does not break the plane formed by the flat surface of face plate 10). Thus, once plugged in, the accessory 40 cannot be unintentionally dislodged by a person or article brushing along the surface 2. Rather, the accessory 40 can only be unplugged by intentional gripping as discussed above with respect to FIG. 1.

While there has been illustrated and described a particular embodiment of the present invention, it will be appreciated that numerous changes and modifications will occur to those skilled in the art and it is intended in the appended claims to cover all those changes and modifications which fall within the true spirit and scope of the present invention.

What is claimed is:

1. A power outlet and phone jack wall adapter comprising:
    a substantially flat face plate suitable to be secured to a surface upon which the adapter is to be mounted;

securing means for securing said face plate to said surface;

a substantially rectangular recess formed by a back wall, two side walls, a top wall and a bottom wall, said back wall forming the backside of the substantially rectangular recess and being substantially parallel to the plane formed by the face plate, said two side walls being substantially opposite to one another and forming the sides of the substantially rectangular recess and said top and bottom walls being substantially opposite to one another and forming the top and bottom, respectively, of said rectangular recess;

an electrical power outlet suitable for coupling with an electrical power plug of an electrical accessory positioned on said back wall; and a telephone jack suitable for coupling with a telephone plug and also positioned on said back wall in close proximity to said electrical power outlet.

2. The adaptor of claim 1 further including an indentation on each of two said side walls such that a user may position fingers in said indentations and between said side walls and said accessory and thereby grip said electrical accessory when said accessory is plugged into said electrical outlet.

3. The adaptor of claim 1 wherein said securing means are bolts.

4. The adaptor of claim 1 wherein said accessory is a power transformer.

* * * * *